US012092305B2

(12) United States Patent
Aanegola et al.

(10) Patent No.: US 12,092,305 B2
(45) Date of Patent: Sep. 17, 2024

(54) ENCLOSURE FOR LIGHT FIXTURE

(71) Applicant: Eaton Intelligent Power Limited, Dublin (IE)

(72) Inventors: Srinath K. Aanegola, Bengaluru (IN); Parameswari V. L. Gundavarapu, Telangana (IN); Andrew F. Scarlata, West Monroe, NY (US); Chinmaya Rajiv Dandekar, Pune (IN); Anand Kumar Ramachandran, Pune (IN); Pushpak Paris Yabrer, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 169 days.

(21) Appl. No.: 17/179,606

(22) Filed: Feb. 19, 2021

(65) Prior Publication Data

US 2021/0262652 A1 Aug. 26, 2021

Related U.S. Application Data

(60) Provisional application No. 62/979,213, filed on Feb. 20, 2020.

(51) Int. Cl.

| | |
|---|---|
| ***F21V 23/02*** | (2006.01) |
| ***F21S 8/00*** | (2006.01) |
| ***F21S 8/04*** | (2006.01) |
| ***F21V 15/01*** | (2006.01) |
| ***F21V 23/00*** | (2015.01) |
| ***F21V 25/12*** | (2006.01) |

(52) U.S. Cl.

CPC .............. *F21V 23/023* (2013.01); *F21S 8/03* (2013.01); *F21S 8/04* (2013.01); *F21V 15/01* (2013.01); *F21V 23/008* (2013.01); *F21V 25/12* (2013.01)

(58) Field of Classification Search

CPC ........ F21V 21/30; F21V 15/01; F21V 23/026; F21V 29/74; F21V 25/12; F21V 31/005; F21V 29/15; F21V 29/50

See application file for complete search history.

(56) References Cited

U.S. PATENT DOCUMENTS

| | | | | |
|---|---|---|---|---|
| 2,196,918 | A * | 4/1940 | Hepworth ............ | G03B 21/134 353/109 |
| 5,477,442 | A | 12/1995 | Self | |
| 7,651,245 | B2 * | 1/2010 | Thomas .................. | F21V 29/74 362/249.02 |

(Continued)

FOREIGN PATENT DOCUMENTS

| | | | |
|---|---|---|---|
| WO | 2015/183566 | A1 | 12/2015 |
| WO | 2018/102024 | A1 | 6/2018 |
| WO | 2019/241198 | A1 | 12/2019 |

OTHER PUBLICATIONS

International Search Report and Written Opinion received for PCT Application Serial No. PCT/EP2021/025062 dated May 3, 2021, 15 pages.

*Primary Examiner* — William J Carter
(74) *Attorney, Agent, or Firm* — Stinson LLP

(57) ABSTRACT

An enclosure assembly includes a housing defining an interior configured to at least partially house one or more electrical components. The housing includes a housing section including an outer plastic portion and an inner metal portion received in the outer plastic portion. An electrical component disposed within the housing section provides power to at least one other electrical component.

16 Claims, 10 Drawing Sheets

(56) References Cited

U.S. PATENT DOCUMENTS

| | | | | |
|---|---|---|---|---|
| 8,338,703 | B2 | 12/2012 | Crohas et al. | |
| 8,827,508 | B2 | 9/2014 | Sagal | |
| 2011/0121734 | A1* | 5/2011 | Pape | B64F 1/20 315/86 |
| 2011/0242828 | A1 | 10/2011 | Blincoe et al. | |
| 2013/0135797 | A1 | 5/2013 | Pavlovic et al. | |
| 2015/0243457 | A1* | 8/2015 | Niu | B32B 37/24 156/247 |
| 2017/0307198 | A1* | 10/2017 | Shah | F21K 9/68 |

* cited by examiner

ENCLOSURE FOR LIGHT FIXTURE

CROSS-REFERENCE TO RELATED APPLICATION

This application claims priority to U.S. Provisional Patent Application Ser. No. 62/979,213, filed Feb. 20, 2020, and which is hereby incorporated by reference in its entirety.

FIELD

The present disclosure generally relates to enclosures and more particularly to a light fixture enclosure.

BACKGROUND

Light fixtures are used in a variety of environments. Many of these light fixtures use advanced technology with a number of components. As a result, these light fixtures can have a number of failure points. In lighting applications, such as hazardous environments, reliability of the lighting system is vital. Unfortunately, the characteristics (e.g., humidity, extreme temperatures, corrosive gas) of many environments, including but not limited to hazardous environments, can cause the failure of one or more components of a light fixture to be accelerated. Further, the health and safety of a person located in such an environment can be at risk. When a light fixture is placed in certain environments, such as a hazardous environment, some of these components of a light fixture can pose a safety hazard and a violation of applicable standards if the components are not properly engineered and integrated with the rest of the light fixture.

SUMMARY

In one aspect, an enclosure assembly generally comprises a housing defining an interior configured to at least partially house one or more electrical components. The housing comprises a housing section including an outer plastic portion and an inner metal portion received in the outer plastic portion. An electrical component disposed within the housing section provides power to at least one other electrical component.

In another aspect, an enclosure assembly generally comprises a housing defining an interior configured to at least partially house one or more electrical components. The housing comprises a first housing section including an outer plastic portion, and a second housing section. A pin connection hingedly attaches the second housing section to the outer plastic portion of the first housing section. The pin connection comprises a metal pin attached to the outer plastic portion of the first housing section. An electrical component is disposed within the housing for providing power to at least one other electrical component.

DETAILED DESCRIPTION

Figure 1:
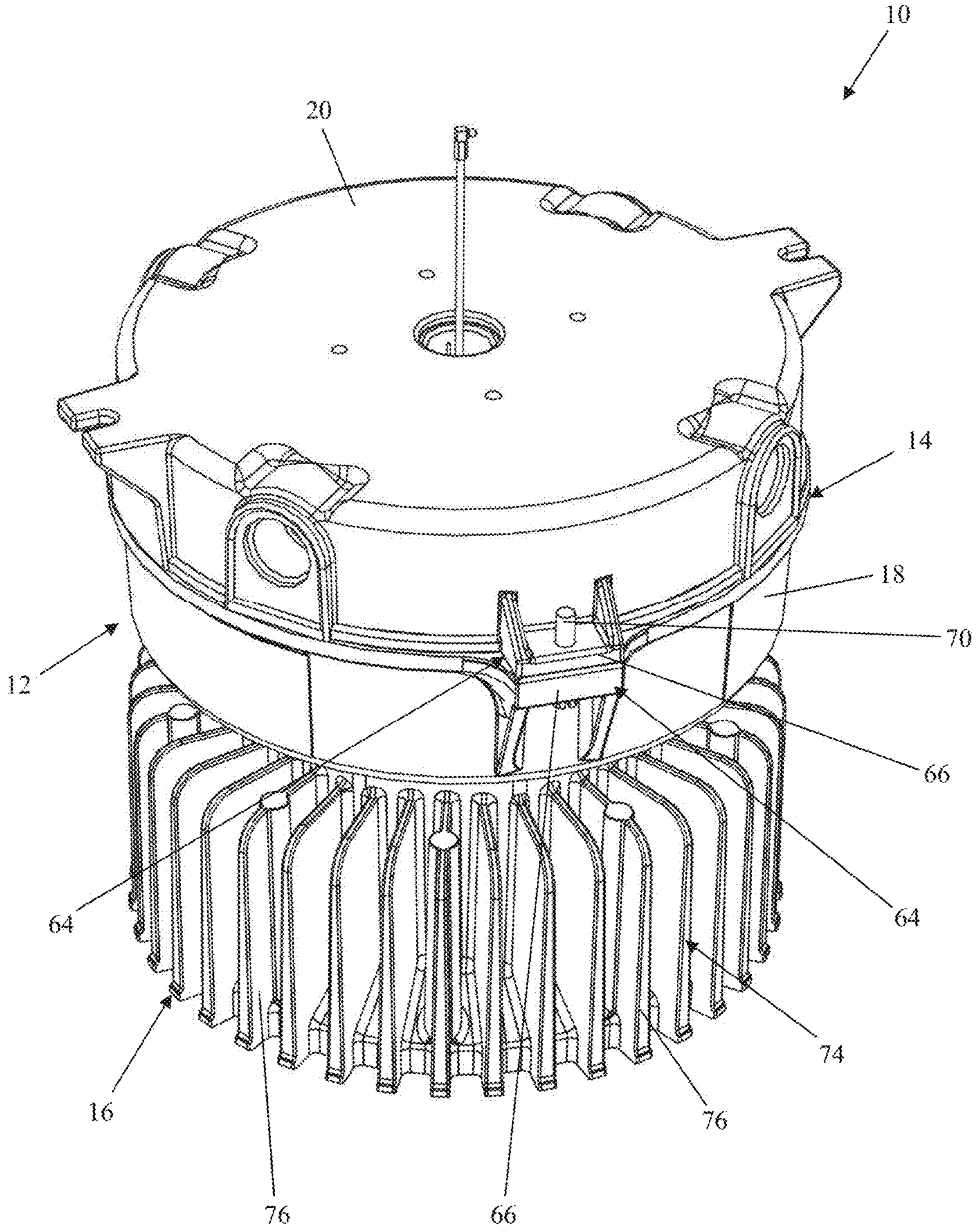
FIG. 1 is perspective of a light fixture.
Figure 2:
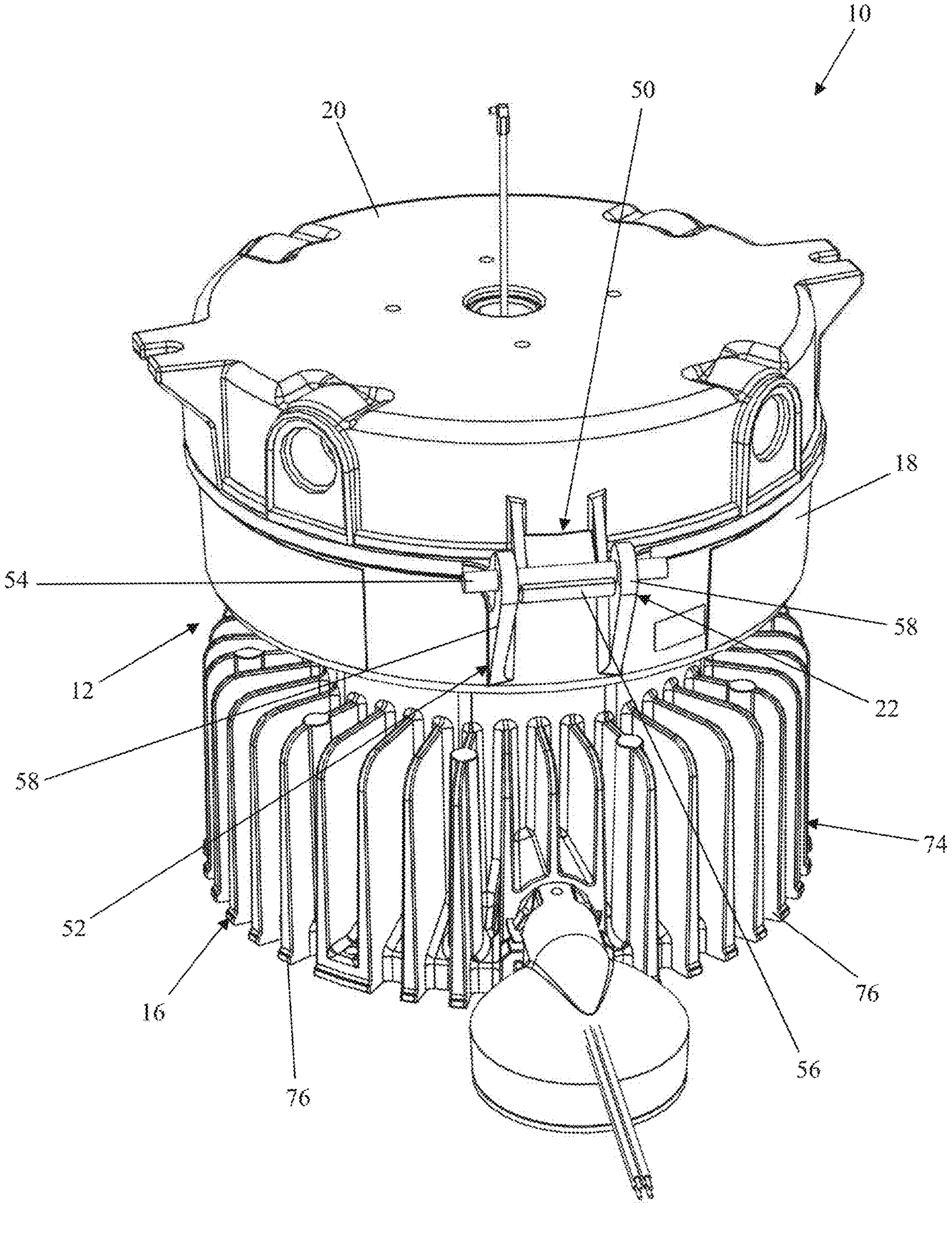
FIG. 2 is another perspective of the light fixture.

Referring to FIGS. 1 and 2, a light fixture is generally indicated at 10. The light fixture comprises a housing 12 defining one or more interior spaces for enclosing the internal components of the fixture. In the illustrated embodiment, the housing 12 comprises a plurality of housing components suitably connected together. However, the housing 12 could comprise a single housing component. In some embodiments, the light fixture 10 can be used in a hazardous environment. In such a case, example embodiments can be located in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A hazardous environment can include an explosion-proof environment, which would require an enclosure with an example moisture control system to meet one or more requirements, including but not limited to flame paths.

An explosion-proof enclosure is a type of hazardous location enclosure. In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exists where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more example embodiments, an explosion-proof enclosure is subject to meeting certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within certain hazardous locations must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and UL (e.g., UL 1203). For example, a Class 1 hazardous area under the National Electric Code is an area in which flammable gases or vapors may be present in the air in sufficient quantities to be explosive. Standards created and maintained by NEMA may be found at www.nema.org.

In one or more example embodiments, the present enclosure is a CID2 hazardous location enclosure and meets UL844 Class I Division 2 requirements.

As defined herein, an electrical enclosure is any type of cabinet or housing inside of which is disposed electrical, mechanical, electro-mechanical, and/or electronic equipment. Such equipment can include, but is not limited to, a controller (also called a control module), a hardware processor, a power supply (e.g., a battery, a driver, a ballast), a sensor module, a safety barrier, a sensor, sensor circuitry, a light source, electrical cables, and electrical conductors. Examples of an electrical enclosure can include, but are not limited to, a housing for a light fixture, a housing for a sensor device, an electrical connector, a junction box, a motor control center, a breaker box, an electrical housing, a conduit, a control panel, an indicating panel, and a control cabinet.

Figure 3:
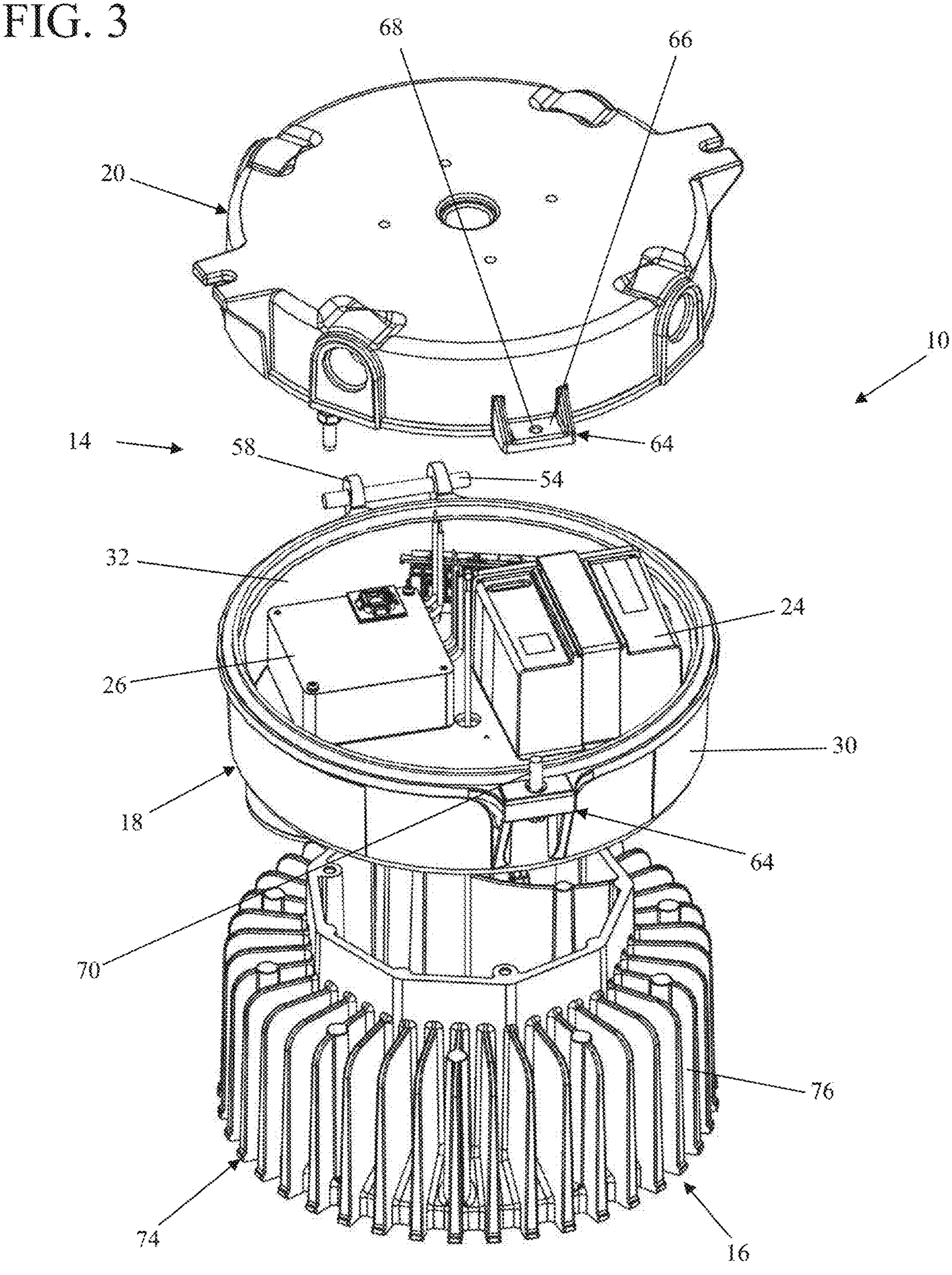
FIG. 3 is an exploded view of the light fixture.

Referring to FIGS. 1-3, the housing 12 comprises a first housing section 14 and a second housing section 16. The first housing section 14 is disposed on top of the second housing section 16 and includes a bottom housing portion 18 and a top housing portion 20 attached to the bottom housing portion. The first housing section 14 alone may be considered a housing or part of a housing whereby the bottom housing portion 18 and the top housing portion 20 comprise first and second housing sections, respectively. In one embodiment, the top housing portion 20 is hingedly attached to the bottom housing portion 18. For example, a pin connection 22 (FIG. 2) may hingedly attach the top housing portion 20 to the bottom housing portion 18. The top housing portion 20 may be constructed from any suitable material. In one embodiment, the top housing portion 20 is formed from metal such that the top housing portion may be characterized as a metal top hat. The first housing section 14 defines an interior space 23 configured for housing one or more components of the light fixture 10. For example, a controller unit 24 for controlling the operation of the light fixture 10 and a driver unit 26 for providing electricity to light sources (not shown) of the light fixture may be housed within the first housing section 14.

Figure 4:
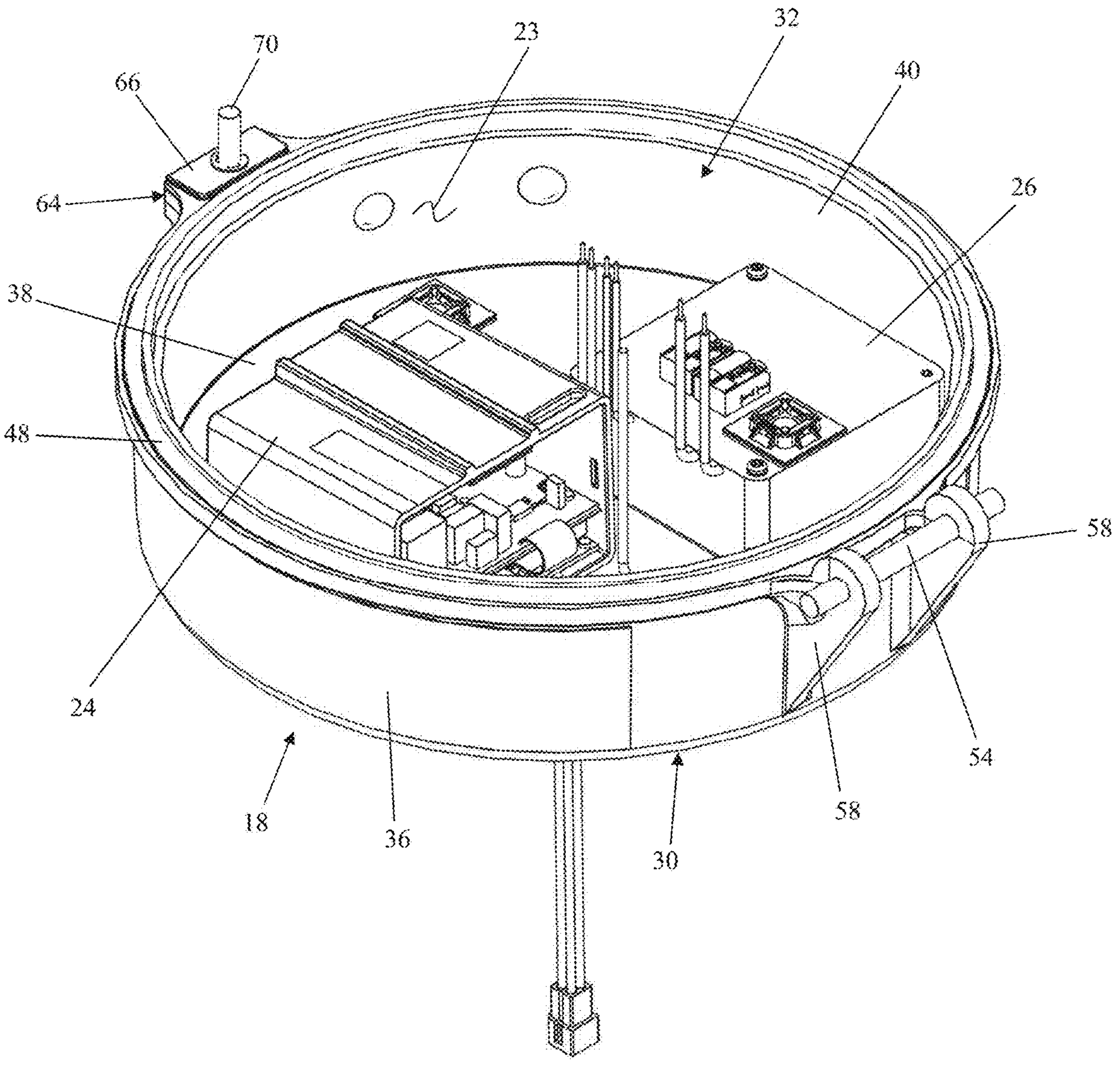
FIG. 4 is a perspective of a driver compartment assembly of the light fixture.

Referring to FIGS. 3 and 4, the bottom housing portion 18 of the first housing section 14 comprises an outer enclosure 30 and an inner enclosure 32 received within the outer enclosure. The controller unit 24 and driver unit 26 are housed within the bottom housing portion 18. In the illustrated embodiment, the outer enclosure 30 comprises a polymeric housing defining the outermost housing structure of the bottom housing portion 18, and the inner enclosure 32 comprises a metal housing mounted within the outer polymeric housing. In one embodiment, the inner enclosure 32 defines an innermost housing structure of the bottom housing portion 18. The polymeric housing 30 includes a bottom wall 34 and a circumferentially extending side wall 36 projecting upward from the bottom wall. In one embodiment, the inner enclosure 32 comprises an aluminum spacer plate having a flat bottom wall 38 and a circumferentially extending side wall 40 projecting upward from the bottom wall. The inner enclosure 32 may have other configurations without departing from the scope of the disclosure. For example, the side wall 40 may project to a greater or lesser extent from the bottom wall 38. Additionally, the inner enclosure may include a single plate having a bottom wall free of a projecting side wall. The thickness of the bottom wall may also vary. Without limitation, a thickness of the bottom wall 38 may be between about 0.05 inches (0.13 cm) and about 0.125 inches (0.32 cm).

Figure 5:
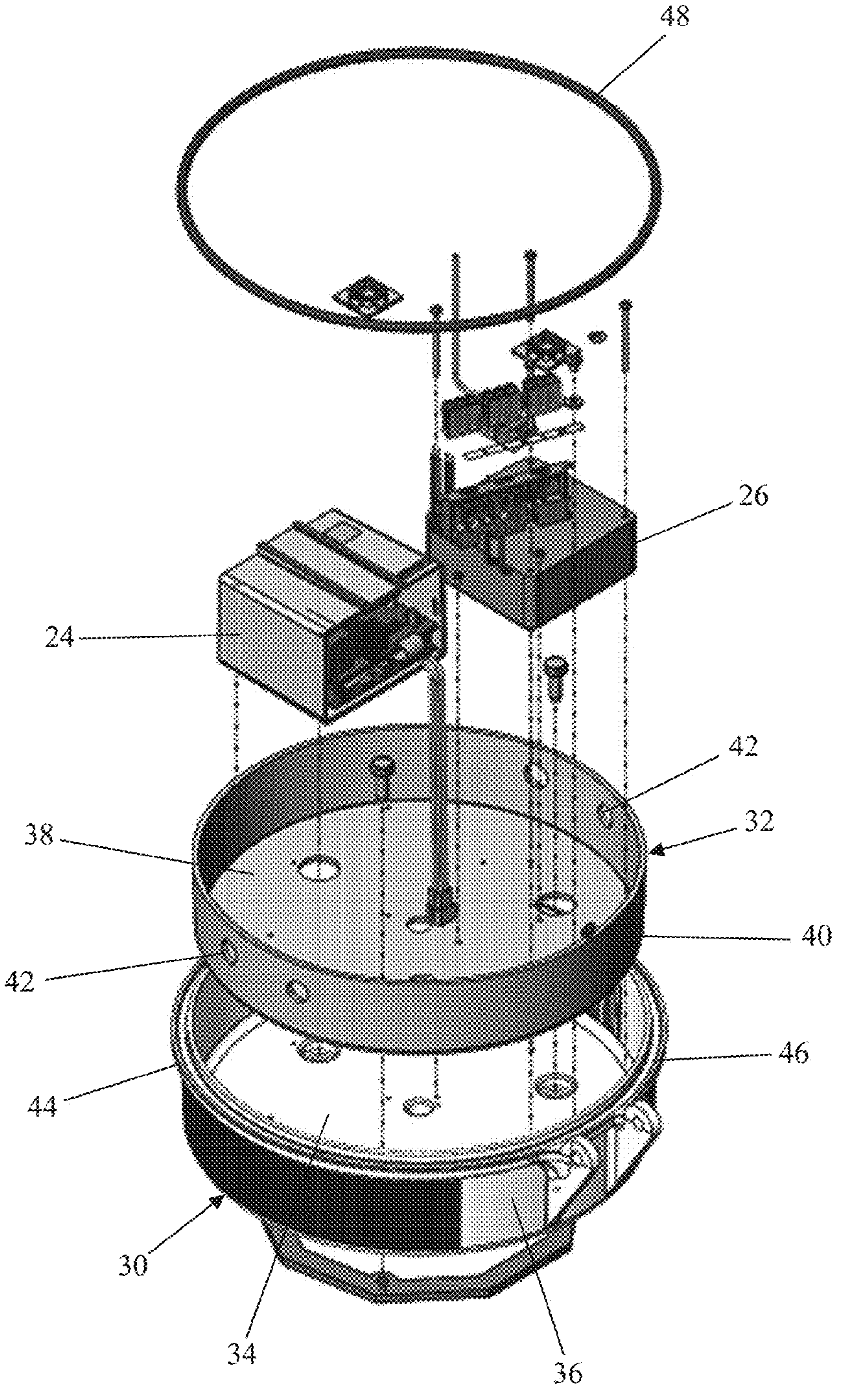
FIG. 5 is an exploded view of the driver compartment assembly.
Figure 6:
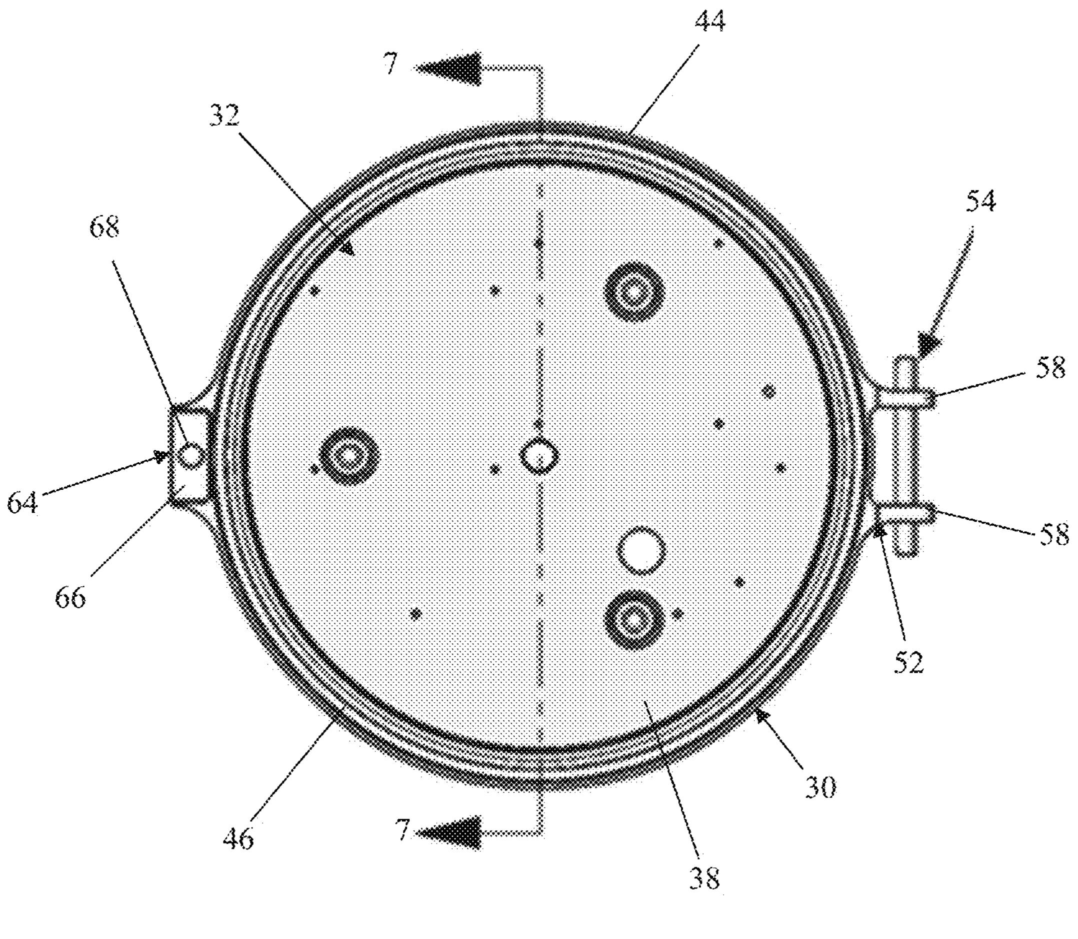
FIG. 6 is a top view of the driver compartment assembly with a controller unit and driver unit removed.
Figure 7:
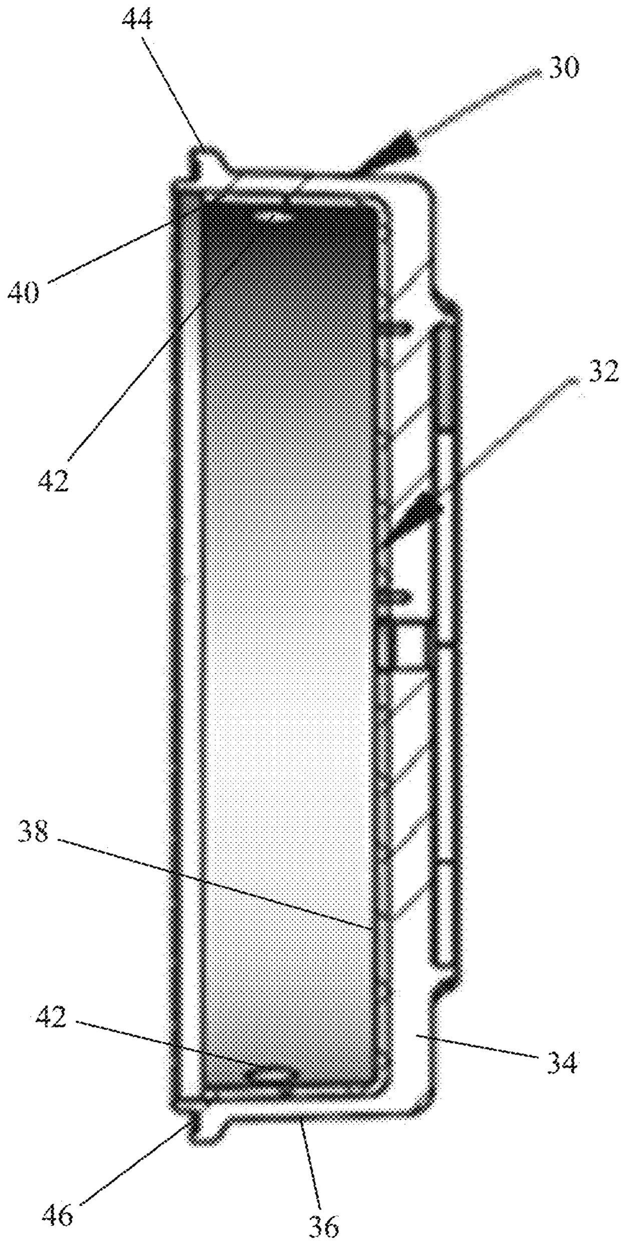
FIG. 7 is section taken through line 7-7 in FIG. 6.
Figure 8:
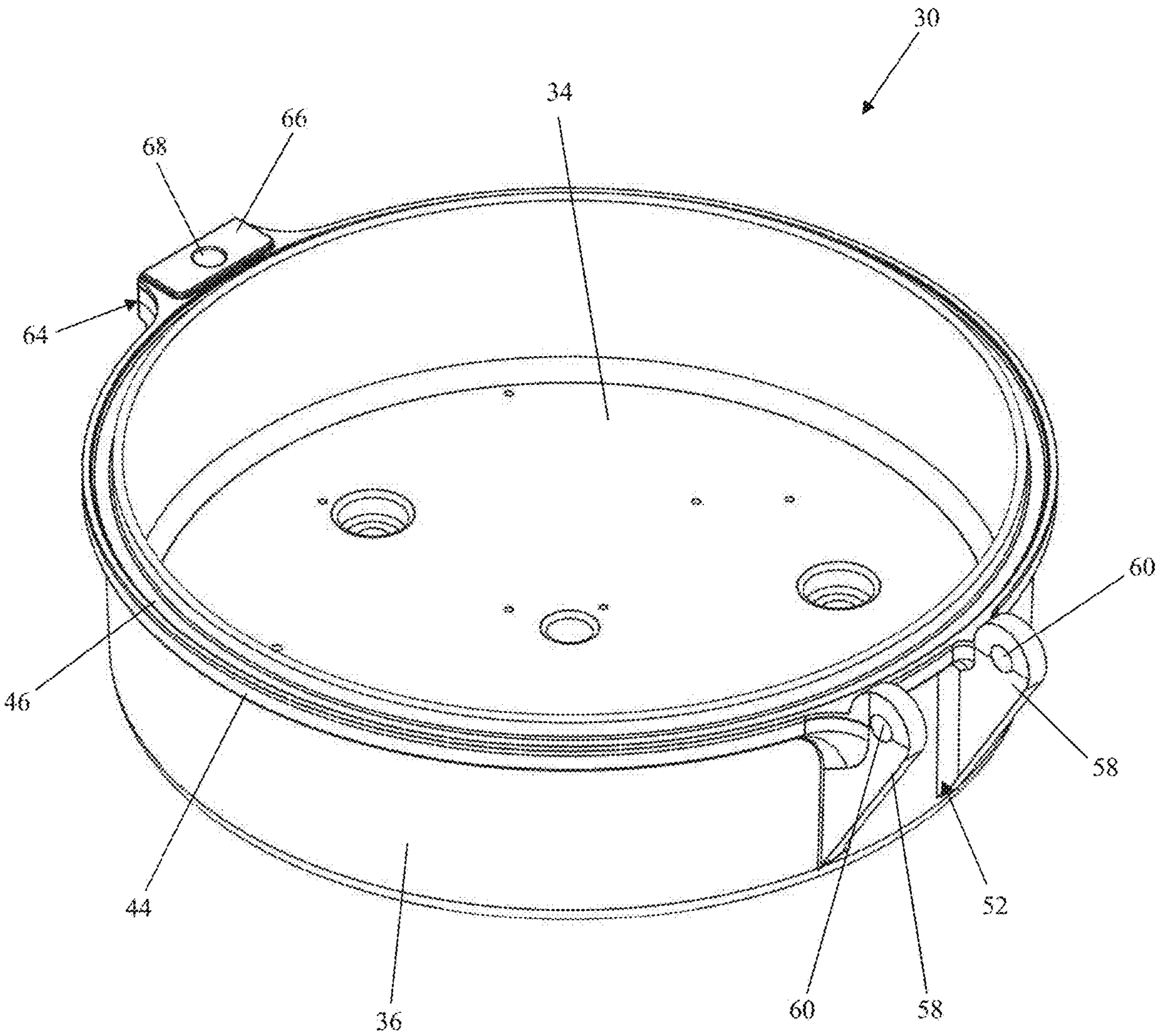
FIG. 8 is a perspective of a driver housing of the driver compartment assembly.
Figure 9:
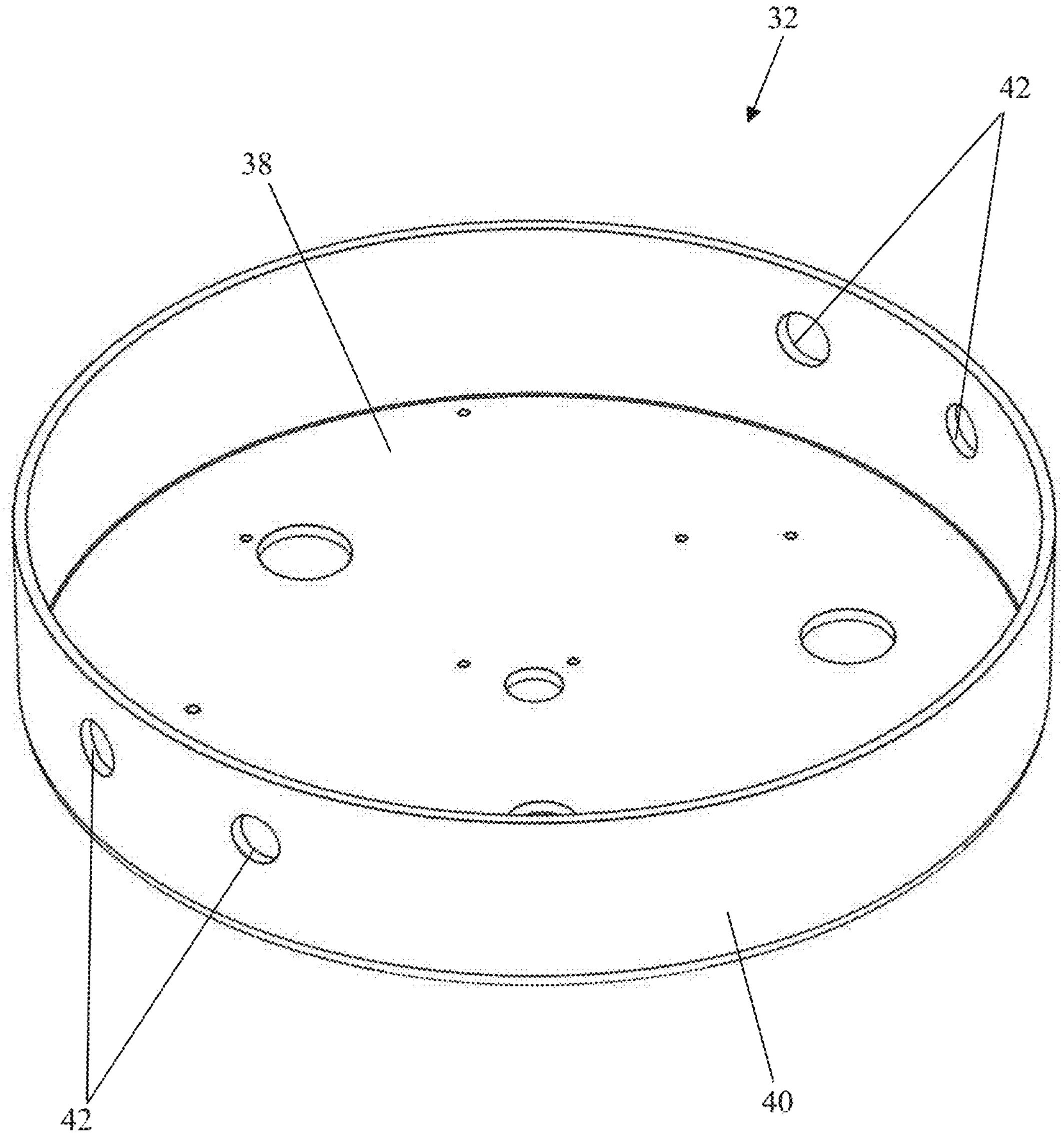
FIG. 9 is a perspective of a spacer plate of the driver compartment assembly.
Figure 10:
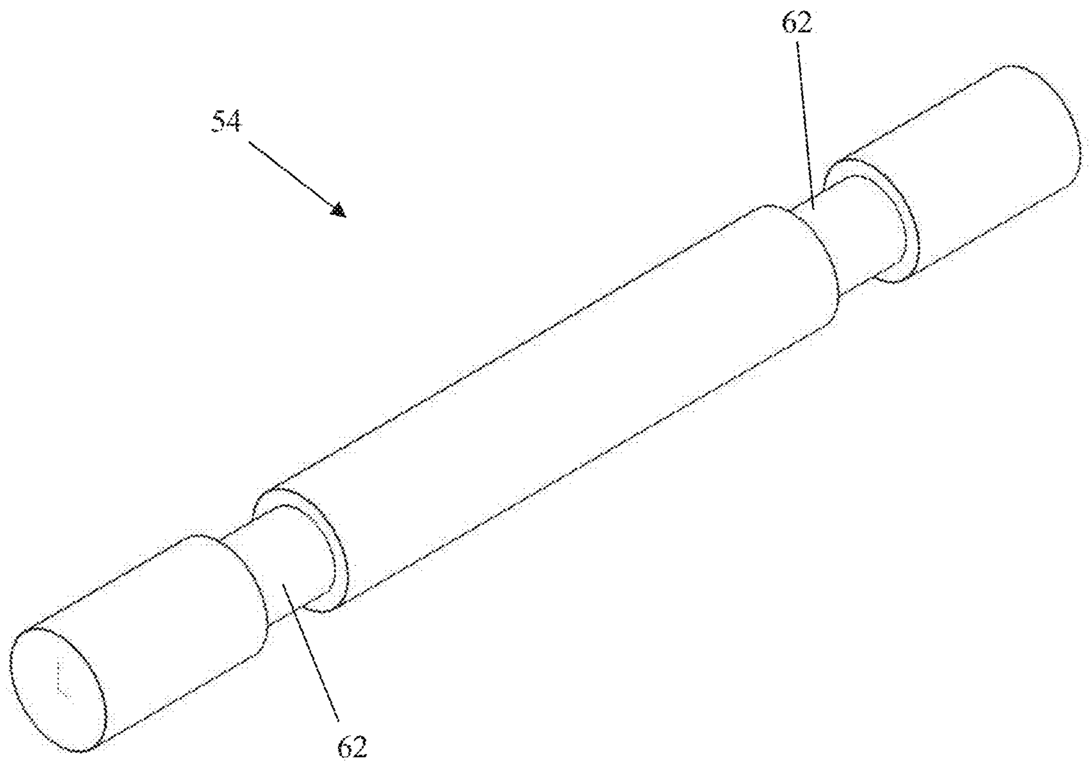
FIG. 10 is a perspective of a pin of the driver compartment assembly.

Referring to FIGS. 5, 6, and 9, a plurality of holes 42 may be formed in the inner enclosure 32 such that the plastic outer enclosure 30 can be overmolded on to the inner enclosure. The holes 42 may be formed in the side wall 40 of the inner enclosure 32. As such, the plastic material of the outer enclosure 30 may flow into the holes 42 in the inner enclosure 32 bonding the outer enclosure to the inner enclosure. However, the outer and inner enclosures 30, 32 may be secured together in other ways without departing from the scope of the disclosure.

The configuration of the polymeric outer enclosure 30 and metal inner enclosure 32 was found to have similar thermal capabilities to lighting enclosures incorporating conventional single aluminum driver housings. Any suitable polymeric material may be used for the outer enclosure 30. Examples include glass reinforced polyester (GRP) and thermoplastics. For instance, SMC 150 produced by Menzolit and SMC 405 produced by Mahindra are suitable materials for the outer enclosure 30. Still other polymeric materials and compounds are envisioned without departing from the scope of the disclosure.

Referring to FIGS. 4-7, a lip 44 projects radially outwardly from the side wall 36 of the outer enclosure 30 and extends circumferentially around the side wall. The lip 44 and side wall 36 define a groove 46 in the outer enclosure 30. The groove 46 is upwardly facing and is configured to receive a gasket 48 which engages a bottom surface of the top housing portion 20 to provide a sealing engagement between the top and bottom housing portions 20, 18 to maintain requirements for the light fixture 10 to comply with applicable standards for hazardous environments.

Referring to FIGS. 2, 4, 6, 8, and 10, the pin connection 22 between the top and bottom housing portions 20, 18 is provided by a first pin engaging formation 50 of the top housing portion, a second pin engaging formation 52 of the bottom housing portion, and a cylindrical pin 54 engaging the first and second pin engaging formations to pivotably attach the top housing portion to the bottom housing portion. The first pin engaging formation 50 comprises a hook 56 extending from a side of the top housing portion 20 near a bottom of the top housing portion. The second pin engaging formation 52 comprises a pair of tabs 58 projecting from the side wall 36 of the outer enclosure 30. Each tab 58 has an opening 60 (FIG. 8) that receives a portion of the pin 54 such that the pin is retained to the tabs. The pin 54 has a pair of reduced diameter sections 62 (FIG. 10) that are received in the openings 60 in the tabs 58. The sections of the pin 54 adjacent the reduced diameter sections 62 have a larger diameter than a diameter of the openings 60 in the tabs 58 thereby retaining the pin in the openings. The hook 56 of the first pin engaging formation 50 on the top housing portion 20 is received around a middle section of the pin 54 between the reduced diameter sections 62 so that the top housing portion can pivot relative to the bottom housing portion 18. The pin engaging formations 50, 52 could have other configurations without departing from the scope of the disclosure. For example, the tabs 58 of the second pin engaging formation 52 could have a different shape, or each tab could be replaced with a pair of tabs to reinforce the engagement between the tabs and the pin 54. In one embodiment, the pin 54 comprises a metal pin and the second pin engaging formation 52 is overmolded on the metal pin. In the illustrated embodiment, the pin 54 extends laterally beyond the tabs 58. However, the longitudinal ends of the pin 54 can be configured such that they do not extend past the tabs 58. For example, the ends of the pin 54 can be flush with the outer surfaces of the tabs 58. When the top housing portion 20 is pivoted to engage the bottom housing portion 18, the gasket 48 on the bottom housing portion seals between the housing portions. Mating locking formations 64 on the top and bottom housing portions 20, 18 facilitate locking the housing portions together. In the illustrated embodiment, the locking formations 64 comprise flanges 66 having fastener holes 68 formed therein for receiving a fastener 70 to secure the top and bottom housing portions 20, 18 together. The top and bottom housing portions 20, 18 could be secured together by other means without departing from the scope of the disclosure.

The second housing section 16 is also configured to house one or more components of the light fixture 10. For example, one or more light sources (not shown) can be disposed on or within, at least in part, the second housing section 16 of the housing 12. A protective cover or lens (not shown) may be provided on the second housing section 16 to cover the light sources. The housing 12 may have one or more communication links (not shown) disposed between the housing sections 14, 16 to operatively connect the components within separate housing sections. Further, the housing sections 14, 16 can be designed to couple to each other in such a way that the entire housing 12 complies with applicable standards (e.g., hazardous location requirements).

A heat sink assembly 74 (broadly, a heat sink) can be disposed on and/or integrated with a portion of the housing 12. In the illustrated embodiment, the heat sink 74 is integrated with a portion of second housing section 16 of the housing 12. The heat sink assembly 74 includes one or more heat sink fins 76 that increase the surface area of the heat sink assembly 74, thereby increasing its thermal transfer efficiency. The heat sink fins 76 can be of any number and/or have any of a number of configurations. In the illustrated embodiment, the heat sink fins 76 are vertically-oriented protrusions that extend outward on the second housing section 16 of the housing 12 and are spaced substantially equidistantly around the outer perimeter of the second housing section. The heat sink fins 76 could have other configurations without departing from the scope of the disclosure.

Additionally, the outer plastic enclosure 30 of the bottom hosing portion 18 of the first housing section 14 thermally isolates an interior of the first housing section from an interior of the second housing section 16. In particular, the polymeric material of the enclosure 30 provides thermal isolation from hot air in the interior of the second housing section 16 generated by the electrical components in the second housing section. Moreover, the metal inner enclosure 32 draws heat from the interior of the first housing section 14 to the exterior of the first housing section to transfer the heat to the periphery of the housing 12. Therefore, the bottom housing portion 18 improves the overall thermal efficiency of the light fixture 10 over conventional light fixtures.

The overall construction of the light fixture 10 is also configured to withstand the environmental conditions and physical demands of hazardous environments. In particular, the thermal endurance of the light fixture 10 ranges from about −35° C. to about 140° C. The light fixture 10 is able to keep the driver unit 26 below a temperature of 85° C. when the fixture is maintained within an environment of 55° C. The fixture 10 is also constructed to withstand a 7J impact at −35° C. and room temperature. Additionally, a load test conducted on the light fixture 10 indicated that the hinged connection between the top and bottom housing portions 20, 18 of the first housing section 14 is configured to support in excess of a 300 lb. load. The housing 12 in general also passed a load test where the housing proved capable of supporting over 170 lbs. for an hour in both the open (top and bottom housing portions 20, 18 in the open position) and closed (top and bottom housing portions in the closed positon) configurations. Therefore, the light fixture 10 meets the physical requirements to operate in hazardous conditions.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the compositions without departing from the scope of the disclosure, it is intended that all matter contained in the above description shall be interpreted as illustrative and not in a limiting sense.

The invention claimed is:

1. An enclosure assembly comprising:

a housing defining an interior configured to at least partially house one or more electrical components, the housing comprising:

a first housing section including an outer plastic portion and an inner metal portion received in the outer plastic portion, the inner metal portion having a bottom wall and defining an interior space housing a controller;

a second housing section formed from metal and attached to a top of the first housing section such that the second housing section comprises a metal top hat; and a third housing section attached to a bottom of the first housing section and enclosing a light source operatively connected to the controller, the third housing section comprising a heat sink in thermal communication with the light source; and an electrical component disposed within the first housing section and mounted directly on the bottom wall within the interior space of the inner metal portion for providing power to the light source.

2. The enclosure assembly of claim 1, wherein the second housing section is hingedly attached to the first housing section.

3. The enclosure assembly of claim 2, further comprising a pin connection attaching the second housing section to the outer plastic portion of the first housing section.

4. The enclosure assembly of claim 3, wherein the pin connection comprises a metal pin.

5. The enclosure assembly of claim 4, wherein the pin includes at least one reduced diameter section for retaining the pin to the outer plastic portion of the first housing section.

6. The enclosure assembly of claim 1, wherein the outer plastic portion defines a groove, a gasket being received in the groove to seal between the first and second housing sections.

7. The enclosure assembly of claim 1, wherein the outer plastic portion is overmolded on the inner metal portion.

8. The enclosure assembly of claim 7, wherein the inner metal portion has a plurality of holes formed therein, the outer plastic portion being molded into the holes to bond the outer plastic portion to the inner metal portion.

9. The enclosure assembly of claim 1, further comprising a controller disposed within the housing section for controlling the operation of the electrical component.

10. The enclosure assembly of claim 1, wherein the heat sink comprises a plurality of fins formed on the housing.

11. The enclosure assembly of claim 1, wherein the enclosure assembly comprises a light fixture.

12. The enclosure assembly of claim 1, wherein the outer plastic portion of the first housing section thermally isolates an interior of the first housing section from an interior of the third housing section.

13. The enclosure assembly of claim 1, wherein the assembly is a CID2 hazardous location enclosure.

14. The enclosure assembly of claim 1, further comprising a plurality of openings in the bottom wall of the inner metal portion.

15. The enclosure assembly of claim 1, wherein the electrical component comprises one of a controller and a driver unit.

16. The enclosure assembly of claim 1, wherein the electrical component comprises a driver unit for providing electricity to the light source.

* * * * *